United States Patent [19]
Van Dest

[11] 3,976,174
[45] Aug. 24, 1976

[54] CLUTCH DISC WITH COAXIAL BRAKE
[75] Inventor: Jean Claude Van Dest, Ris-Orangis, France
[73] Assignee: Massey-Ferguson Inc., Detroit, Mich.
[22] Filed: Apr. 23, 1975
[21] Appl. No.: 570,899

[52] U.S. Cl. .............................. 192/13 R; 192/18 R
[51] Int. Cl.² ..................... B60K 41/24; F16D 67/02
[58] Field of Search ............. 192/13 R, 13 A, 18 R, 192/12 R

[56] References Cited
UNITED STATES PATENTS

| | | | |
|---|---|---|---|
| 1,936,685 | 11/1933 | Moorhouse | 192/13 R X |
| 2,891,642 | 6/1959 | Moore | 192/18 R |
| 3,097,731 | 7/1963 | Wells | 192/13 R |
| 3,540,557 | 11/1970 | Hasselbacher et al. | 192/13 R X |
| 3,722,643 | 3/1973 | Kempf et al. | 192/13 R |
| 3,763,977 | 10/1973 | Sink | 192/13 R X |

Primary Examiner—Samuel Scott
Assistant Examiner—Lance W. Chandler
Attorney, Agent, or Firm—William R. Nolte

[57] ABSTRACT

This specification discloses a transmission clutch brake for use in a torque delivery gear system. A rotatable clutch disc driven by an input shaft and selectively engageable by a pressure plate carries a pair of plates. The plates embrace a brake plate carrying friction material on opposite faces thereof. Upon disengagement of the pressure disc from the clutch plate one of said plates of said pair is moved axially relative to the other thereof in a clamping manner to grip the brake plate against rotation. The latter brake plate is connected to a stationary splined hub utilizing a snap ring. The ring acts as a torsion spring and permits limited slight rotation of the brake plate and clutch disc clamped thereto as well as the input shaft to facilitate meshing of gears of the transmission.

14 Claims, 4 Drawing Figures

CLUTCH DISC WITH COAXIAL BRAKE

FIELD OF THE INVENTION

This invention relates to clutch assemblies connected between an engine and a gear transmission and is particularly directed to a transmission brake in the clutch. The transmission brake engages on disengagement of the clutch. A feature of this invention is that the transmission brake fits in the clutch assembly without increasing the length of the clutch assembly or of the tractor.

BACKGROUND OF THE INVENTION

An agricultural tractor is usually driven rather slowly when pulling an implement and the tractor stops on disengagement of the clutch. However, the gears on the input shaft and connected structure, such as the clutch plate and a countershaft often continue to rotate after the clutch is disengages since there is nothing to stop them. If the gears are not synchronized, the operator has either to clash gears and attempt to change speed or wait until the gears slow down before shifting. This may take some time if the gears are not stopped by braking means. With synchronization there is no clashing of the spinning gears as the gears to be meshed are brought to the same speed. However, although synchronization is readily available for smaller and lighter duty transmission, it is often not useful for larger transmission components. For this reason, not only is synchronizing of heavier transmission components apt to be more expensive, but the loads imposed by synchronizer mechanisms and gear trains on the shift linkage can undesireably increase the shifting effort required. A transmission brake thus often is more desirable. It is desirable that the transmission brake be compact and take as little of the length of the tractor as possible.

OBJECTS OF THE INVENTION

An object of the invention is to provide a transmission brake that occupies a minimum amount of space particularly lengthwise of the tractor.

Other objects of the invention provide a transmission brake that operates automatically during declutching, that does not employ hydraulics of other powered means and that does not require a separate operating means.

Another object of the invention is to provide a transmission brake that is reliable, inexpensive and easy to manufacture.

Other objects and advantages will be apparent from the detailed description and the drawings.

DETAILED DESCRIPTION

Figure 1:
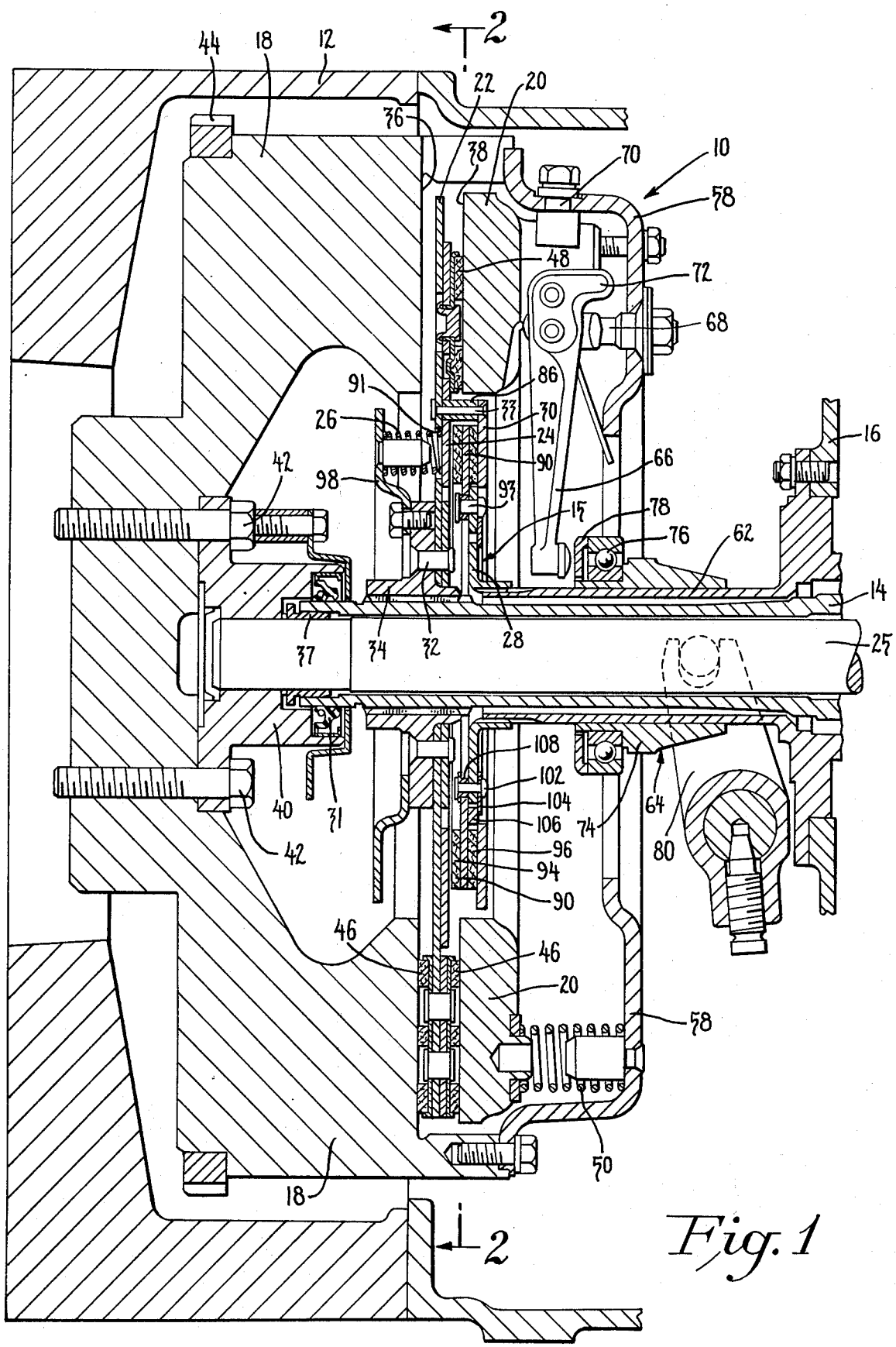
FIG. 1 is a longitudinal cross-sectional view of the engaged clutch and disengaged brake taken along line 1 — 1 of FIG. 2.

Referring to FIG. 1 of the drawings a clutch assembly 10 is shown in a housing 12 and drives a tubular shaft 14 which is connected to a transmission (not shown) in a casing 16. The clutch assembly comprises a clutch 10 and a transmission brake 15.

The clutch 10 comprises a flywheel 18, a pressure plate 20 and a clutch disc 22. The transmission brake comprises a fixed flange 28 engaged by rotatable braking plates 24 and 30, FIG. 3.

CLUTCH

The flywheel 18 is connected to a power source (not shown). The connection is in the usual manner. The pressure plate 20 is also mounted in a common manner and is moved to the right by the clutch release levers 66. The flywheel and pressure plate have faces 36 and 38, respectively, gripping the clutch disc 22, as shown in lower part of FIG. 1. the clutch disc 22 is mounted by rivets 32 on the hub 34. The hub is splined to the input shaft 14. The shaft 14 is mounted on the bearing 37, in turn mounted on PTO shaft 25. The PTO shaft is attached to the block 40 which is fastened to the flywheel by bolts 42. A seal 31 around the shaft 14 prevents oil leakage and protects the bearing 37. A ring gear 44 is mounted on the periphery of the flywheel for starting the engine.

The clutch disc 22 has friction pads 46 on its opposite faces for engagement by the pressure plate 20 and the flywheel 18 respectively. The pads are riveted to the clutch disc 22. The pressure plate and flywheel turn the clutch disc when it is engaged and shaft 14 turns with the clutch disc and thereby transmits driving force to the transmission. The clutch is engaged when the springs 50 force the pressure plate 18 against the clutch disc 22 which then forces the disc against flywheel 18. The clutch disc is disengaged when the pressure plate 20 is moved away from the flywheel 18. The springs 50 are circumferentially spaced around the clutch and extend between the cover 58 and the pressure plate 20.

The housing 16 has a tubular extension 62 which is bolted to the housing. A clutch release bearing assembly 34 which is slideably mounted on the extension 62, engages the clutch release levers 66. There are three levers circumferentially spaced around the extension. They are rotatably mounted on the pins 68 which are attached to the cover 58. The pressure plate 20 is guided by and held from rotation with respect to cover 58 by the rollers 70. The actuating levers 66 have projections 72 for engaging covers 58 to limit the movement of the levers.

The throwout assembly 64 comprises a sleeve 74, a ball bearing 76 with a throwout plate 78. The assembly is moved by the yoke or fork 80.

TRANSMISSION BRAKE

The transmission brake 15 comprises a rotatable part and a fixed part. The rotatable part comprises the plates 24 and 30. The fixed part comprises flange 28 and the plate 90. Flange 28 is splined to extension 62 by hub 29. Friction pads 94 and 96 are bonded to plate 90 and positioned to engage plates 24 and 30.

Figure 2:
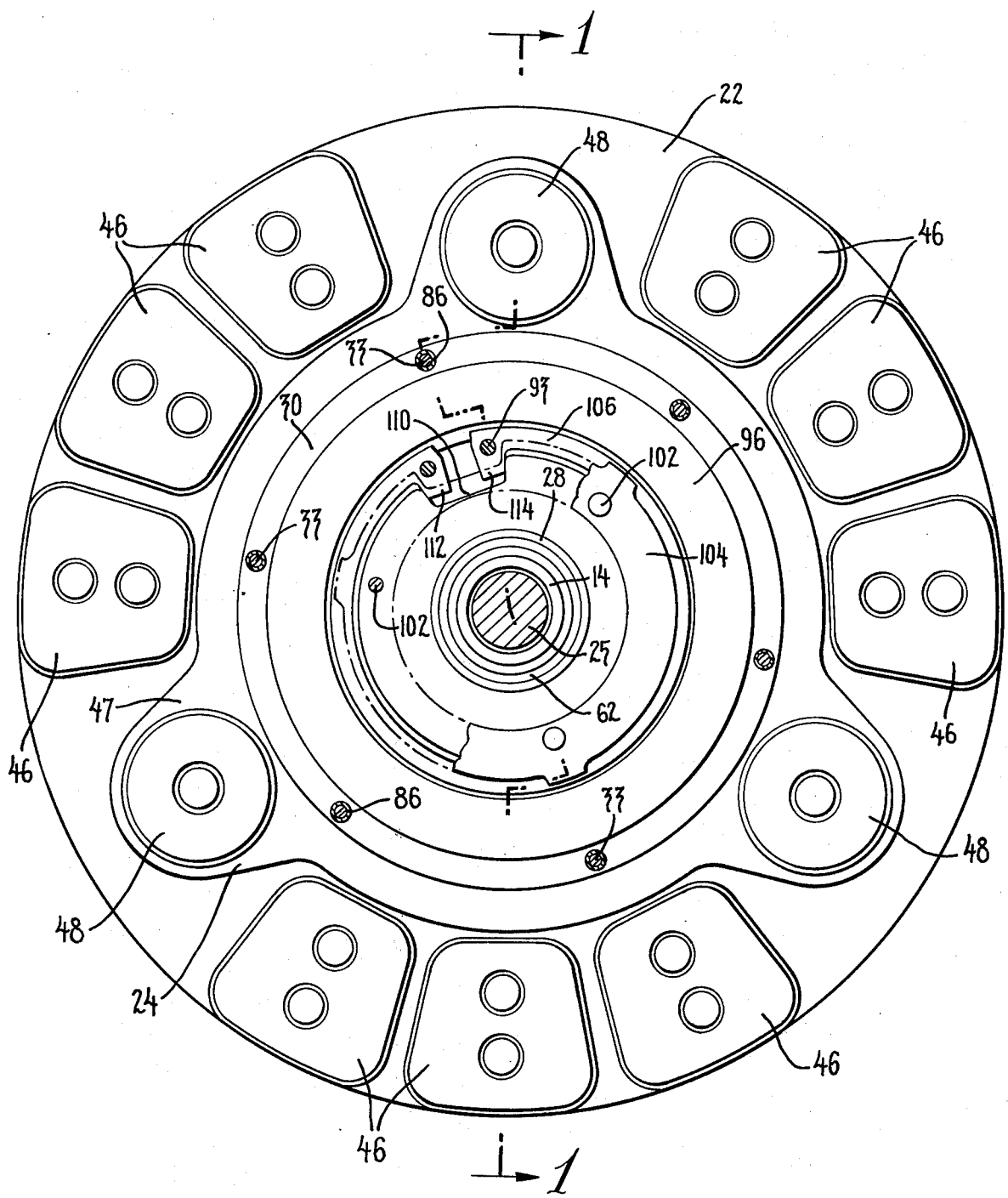
FIG. 2 is a plan view of the clutch plate taken in the direction of arrows 2 — 2 of FIG. 1.

The transmission brake plates 24 and 30 are mounted on the clutch disc 22 and rotate therewith. The transmission brake plate 24 is fixed circumferentially and is axially slideable relative to the clutch disc 22 whereas the transmission plate 30 is fixed both circumferentially and axially on the clutch disc. The transmission brake plate 24 is generally circular and includes a central hole 35. Rivets 33 fasten plate 24 to disc 22. The outer edge of plate 24 has extensions 47 FIG. 2 for pads 48. The pads 48 are on the side of plate 24 facing pressure plate 20. The plate 24 is axially slideable on the sleeve 86 which is fastened to the clutch disc by rivets 33. The springs 26 force the plates 24 and 30 into braking relation with pads 94 and 96. The outer rivets 33 pass axially through the sleeves 86 and attach the brake plate 30 to the clutch disc 22. Both brake plates are ring shaped and as mentioned above the brake plate 24 carries the friction pads 48, see FIG. 2. The pads 48 are engaged by the pressure plate 20 to release the transmission brake. The brake includes a plate which extends between the rotatable brake plates 24, 30 and is attached to the previously mentioned stationary flange 28 splined on the extension 62 which is bolted to the transmission casing 16, see FIG. 1.

The hub 34 has a flange member 98 bolted thereto. The flange member 98 carries compression springs 26 which pass through holes 91 in cutch disc 22 and bear against the axially moveable brake plate 24. The stationary flange member 90 is ring-shaped and is resiliently associated with fixed flange 28by the rivets 93, spacers 92 and the resilient ring 106. This flange member 90 supports the shoes 94, 96 engaged by the rotatable brake plates 24, 30. The springs 26 provide the braking pressure.

Figures 3, 4:
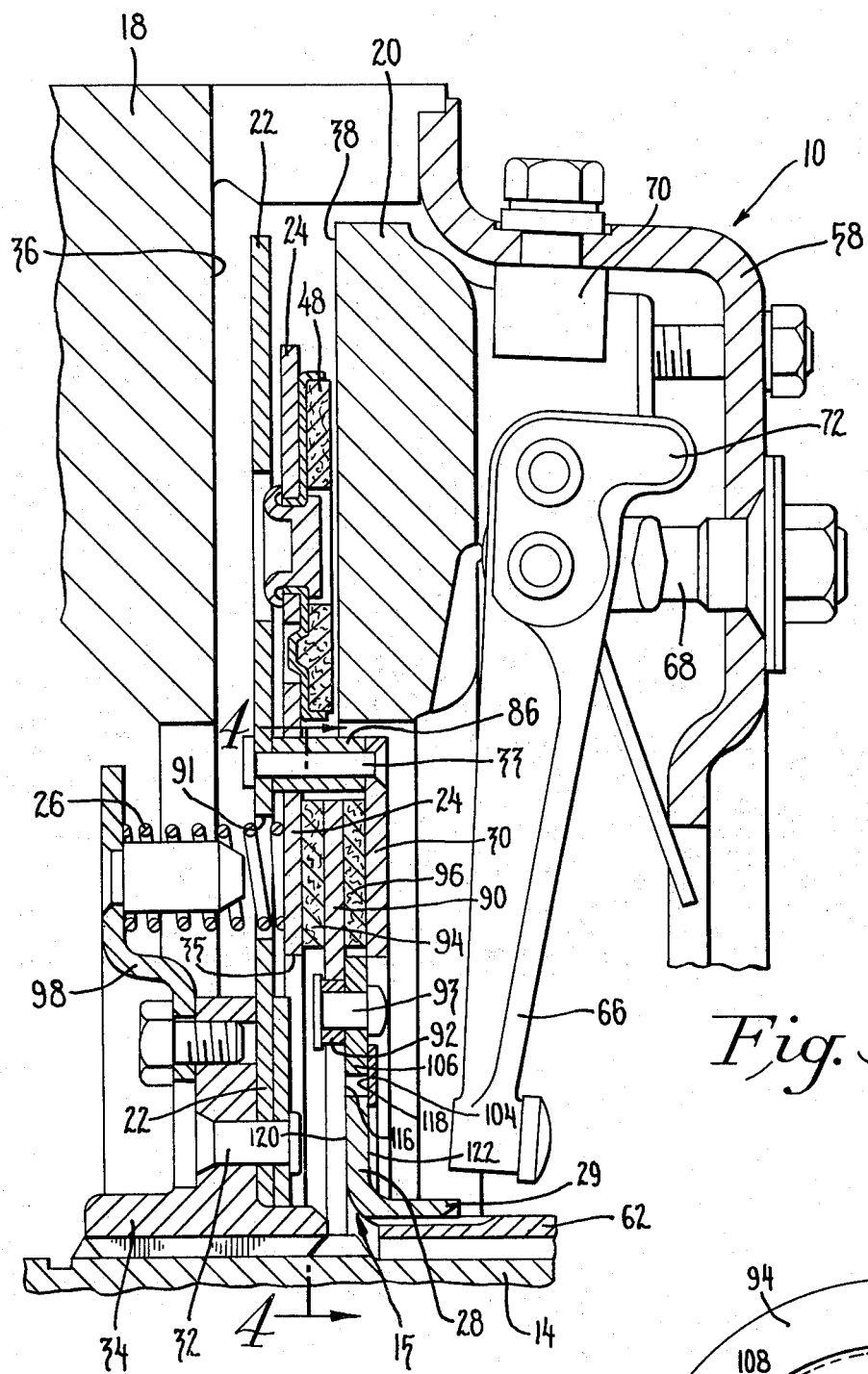
FIG. 3 is an enlarged partial longitudinal cross-sectional view of the disengaged clutch and engaged brake similar to FIG. 1.
FIG. 4 is a partial fragmentary view of the transmission brake.

As the clutch is disengaged FIG. 3 the pressure plate 20 moves to the right and is spaced from the friction linings 46 and 48. The pressure plate moves enough to the right to disengage the friction pads and permits the brake plate 24 to slide axially to engage the shoe 94 under the pressure of the springs 26.

The springs 26 also force the second brake member 30 against the shoe 96 through the flange member 98, hub 34, disc 22, rivet 33.

The member 90 is resiliently connected to the flange 28 by means of the resilient split ring 106. The ring 106 is positioned and attached between ring-shaped plate retainer 104, FIG. 2, and the member 90, but is not fixed to either. The plate 104 and spacers 108 are fastened to the flange 28 by rivets 102.

CONCLUSION

It will be thus seen that the flange 28 with brake shoes 94 and 96 as well as the brake plates 24 and 30 extends radially. The transmission brake is within the clutch.

The resilient ring 106 is retained within the space defined by the spacers 108, plate 104 and plate 90, but is free to flex radially therein. The opposed free ends of the ring are provided with inwardly extending projections 112 and 114, FIG. 4, which project radially inward into notch 110 in plate 28. Face 116 of plate 90 and face 118 of ring 104 are in contact with respectively opposite faces 120, 122 on plate 28.

The ring ends 112 and 114 are also each provided with an axially extending rivet and bushing 92 which extend into notch 117 in plate 90. The latter notch 117 is positioned substantially axially in alignment with notch 110 in the illustrated embodiment. The bushings 92 secured to ring ends 112, 114 are in facing relationship with the substantially radially extending surfaces 120–122 of plate 28 and are moveable in notches 110 and 117.

The plate 90 like ring 116 is moveably associated with plate 28. Plate 90 is confined to the position shown by spacer bushings 108, rivets 102, bushings 92, rivets 93, and ring 106.

When braking action is provided on shaft 14 by plate 24, the braking force is transmitted from member 28 through resilient member 106 to plate 90, shoes 94, 96, to plates 30, 24, rivet 33 to plate 22, rivet 32, sleeve 34 and shaft 14 to the transmission input and gears drivingly connected thereto.

The transmission of force between members 28 and 90 is via the wall of notch 110, projection 114, or 112, depending on rotation, and one of the rivet 93-pin 92 combinations, and the wall of notch 116, The resilient ring 106 permits relative rotational movement in this chain specifically between 28 and 90. This permits a slight rotation of connected gears in the braked position when a shifter is moved to change ratio and this facilitates meshing. With proper tapering of the gear teeth shifting can be accomplished even though the tractor may be stopped and the input shaft braked.

I claim:

1. A brake for stopping a rotatable member driven by a clutch said clutch having a flywheel, a pressure plate and a clutch disc, said clutch disc being on said rotatable member and forced into driving relation with said flywheel by said pressure plate characterized by brake means on said clutch disc to rotate therewith, a stationary member engagable by said brake means, said brake means actuated by said pressure plate to disengage said brake means from said stationary member and to rotate with said clutch disc on engagement of said clutch and on disengagement of said clutch said brake means engaging said stationary member to stop said rotatable member.

2. A brake as set forth in claim 1 wherein said driven member is an input shaft of a transmission.

3. A brake as set forth in claim 1 wherein said brake means is at least one brake plate on said clutch disc.

4. A brake as set forth in claim 3 wherein said one brake plate has pads for engaging said pressure plate.

5. A brake as set forth in claim 3 wherein said one brake plate is axially slidable and circumferentially fixed on said clutch disc to slide from said stationary member on engagement of said clutch.

6. A brake as set forth in claim 5 wherein springs are provided and said springs engage said one brake member plate and press said plate against said stationary member.

7. A brake as set forth in claim 1 wherein said stationary member comprises a fixed flange.

8. A brake as set forth in claim 3 wherein said input shaft includes a flange fixed thereto, springs means mounted between said flange and said one brake plate to urge said brake plate against said stationary member.

9. A brake as set forth in claim 1 wherein said brake means is two brake plates.

10. A brake as set forth in claim 8 wherein one of said brake plates is axially slideable and circumferentially fixed on said clutch disc and the other brake plate is circumferentially fixed on said clutch disc.

11. A brake as set forth in claim 7 wherein said stationary member includes a fixed casing with an extension and said flange is mounted on said extension, said braking plate is forced against said flange.

12. A brake as set forth in claim 1 wherein said stationary member has an engaged portion and a supporting portion, a resilient ring-shaped member between said engaged portions and supporting said engaged portion, and parallel to said clutch disc to provide limited movement of said engaged portion and said supporting portion.

13. A brake for stopping a rotatable shaft driven by a clutch having a flywheel, a pressure plate and a clutch disc affixed to said rotatable shaft and forced into driving relation with said flywheel by said pressure plate characterized by a stationary member around said rotatable shaft and having a flange parallel to said clutch disc, a brake member axially slideable and circumferentially fixed on said clutch disc, a flange like member on said shaft on the opposite side of said clutch disc from said brake member, springs between said flange-like member and said brake member to urge said brake member against said flange, on engagement of said clutch said pressure plate actuating said brake member to compress said springs and disengage said brake member from said flange and on disengagement of said clutch said springs forcing said brake member against said flange to be in braking relation with said rotatable shaft.

14. A brake for stopping a rotatable shaft driven by a clutch having a flywheel, a pressure plate and a radially extending clutch disc affixed to said rotatable shaft and forced into driving relation with said flywheel by said pressure plate characterized by a stationary member around said rotatable shaft having a flange parallel to said radially extending clutch disc; a shoe on said flange; a first radially extending brake plate and a second brake plate; said first brake plate axially and circumferentially fixed on said clutch disc said second brake plate axially slideable and circumferentially fixed on said clutch disc; a flange-like, radially extending member on said shaft on the opposite side of said clutch disc from said second brake plate; springs between said flange-like member and said second brake plate to press said first and second brake plates into braking contact with said first and second brake shoes respectively on disengagement of said clutch, said springs forcing said first and second brake plates against said first and second shoes, respectively, to be in braking relation with said rotatable shaft, said pressure plate actuating said second brake plate and compressing said springs and disengaging said first and second brake plates from said shoes upon engagement of said clutch.

* * * * *